United States Patent [19]

Sakamoto

[11] Patent Number: 5,503,454
[45] Date of Patent: Apr. 2, 1996

[54] ARRANGEMENT FOR SECURING TERMINAL ENDS OF AN AUTOMOTIVE SEAT COVERING MEMBER

[75] Inventor: Takao Sakamoto, Akishima, Japan

[73] Assignee: Tachi-S Co., Ltd., Tokyo, Japan

[21] Appl. No.: 139,511

[22] Filed: Oct. 19, 1993

[51] Int. Cl.[6] ............................... A47C 31/02
[52] U.S. Cl. ........................ 297/218.1; 297/218.5
[58] Field of Search ................ 297/218.1, 218.5, 297/452.59; 5/402, 403

[56] References Cited

U.S. PATENT DOCUMENTS

| | | | |
|---|---|---|---|
| 1,020,407 | 3/1912 | Foster | 5/402 |
| 3,758,159 | 9/1973 | Morris | 297/218.1 |
| 3,995,892 | 12/1976 | Hellman et al. | 297/218.1 |
| 4,568,124 | 2/1986 | Kanai . | |
| 4,789,201 | 12/1988 | Selbert | 297/218.1 |
| 4,798,416 | 1/1989 | Faust et al. | 297/218.1 |
| 5,095,565 | 3/1992 | Brown | 5/403 |

FOREIGN PATENT DOCUMENTS

| | | | |
|---|---|---|---|
| 1057238 | 5/1952 | France | 5/402 |
| 2263345 | 1/1975 | France | 297/218.1 |
| 2358270 | 2/1978 | France | 297/218.1 |
| 2928473 | 1/1981 | Germany | 297/218.5 |

*Primary Examiner*—Richard A. Bertsch
*Assistant Examiner*—Roland G. McAndrews
*Attorney, Agent, or Firm*—Oldham & Oldham Co.

[57] ABSTRACT

An arrangement for securing a terminal end of a covering member in an automotive seat, in which a carpet is laid on the reverse side of the seat, the arrangement comprising a securing member provided at the terminal end of covering member and a securing groove formed on the reverse surface of seat frame of the seat. By inserting the securing member in the securing groove, both terminal ends of the covering member and end of the carpet can be secured to the seat frame at the same time, and further there may be eliminated such creation of level difference or unevenness in the carpet on the reverse side of seat.

9 Claims, 3 Drawing Sheets

ARRANGEMENT FOR SECURING TERMINAL ENDS OF AN AUTOMOTIVE SEAT COVERING MEMBER

BACKGROUND OF INVENTION

1. Field of the Invention

The present invention relates to an arrangement for securing the terminal ends of a covering member in an automotive seat, and in particular to the same arrangement used in a seat back associated with a forwardly-foldable-type seat wherein the seat back may be folded forwardly onto a seat cushion of the same seat, transforming the reverse side thereof into a load-carrying platform for receiving an article or baggage thereon.

2. Description of Prior Art

In the forwardly foldable type of seat, a seat back may be folded forwardly onto a seat cushion, so that the reverse side of seat back shows up as a plane serving as a load-carrying platform on which articles or baggages can be placed. FIG. 1 shows a conventional seat back (SB') used in this particular kind of seat. The seat back (SB') is comprised of a blow-molded seat back frame (1') of a lightweight-oriented configuration, which has a flat reverse surface (1a'), a foam cushion member (3), a covering member (4) for covering the foam cushion member (3), and a a carpet (2) to be laid on the reverse surface (1a) of seat frame (1'). In the assemblage of this seat back (SB'), as indicated in FIG. 1, with the cushion member (3) placed on the uneven frontal side (1b') of seat back frame (1'), the covering member (4) is affixed over both cushion member (3) and seat back frame (1') such that the terminal ends (4a) thereof are fixed on and along the peripheral area of the seat back frame reverse surface (1a) by means of plural staple-like securing elements (5). Then, the carpet (2) is laminated and secured upon those seat back frame reverse surface (1a') and covering member terminal ends (4a), by means of push-type clip members (6). As understandable in FIG. 1, the clip members (6) are forcibly inserted and secured firmly in predetermined plural holes perforated in both layers of the seat back frame reverse surface (1a') and covering member terminal ends (4a).

With the foregoing structure, the terminal ends (4a) of covering member (4) are secured to the seat back (SB') together with the carpet (2). But, this conventional securing arrangement has been found defective in requiring the plural staple-like securing elements (5) for securement of the covering member terminal end (4a) to the seat back frame reverse surface (1a') and further in requiring the plural clip members (6) for securement of the carpet (2) thereon. It has made the relevant working processes very troublesome and slow. What is worse, the resultant reverse-side appearance of seat back(SB') shows an objectionable recessed area in the central area of carpet (2), because the covering member terminal ends (4a) underlaying the carpet (2) creates a level difference along the peripheral area of that particular carpet (2).

SUMMARY OF THE INVENTION

In view of the above-stated drawbacks, it is therefore a primary purpose of the present invention to provide an improved arrangement which permits an easy securement of both terminal ends of covering member and outer ends of carpet to a seat frame in an automotive seat.

In order to achieve such purpose, in accordance with the present invention, there is basically provided an arrangement comprising a securing groove formed in the reverse surface of the seat frame, and a securing means provided at the terminal end of covering member, wherein the securing means is inserted in said securing groove so as to firmly secure the terminal end of covering member to the seat frame, while, at the same time, securing the end of carpet at the reverse surface of seat frame.

For instance, the securing means may comprise a plate-like securing member, a generally U-shaped securing member or an arrow-shaped securing member, made of a synthetic resin material, as its preferred modes for effecting the foregoing securement of both ends of covering member and carpet to the seat frame in conjunction with the securing groove.

In the case of the securing means assuming such mode of plate-like or generally U-shaped securing member, there will be eliminated the creation of level difference or unevenness in the carpet that is found in the prior art.

Any other features and advantages will become readily apparent from the reading of description hereinafter, with reference to the drawings.

DETAILED DESCRIPTION OF PREFERRED EMBODIMENTS OF THE INVENTION

Figure 1:
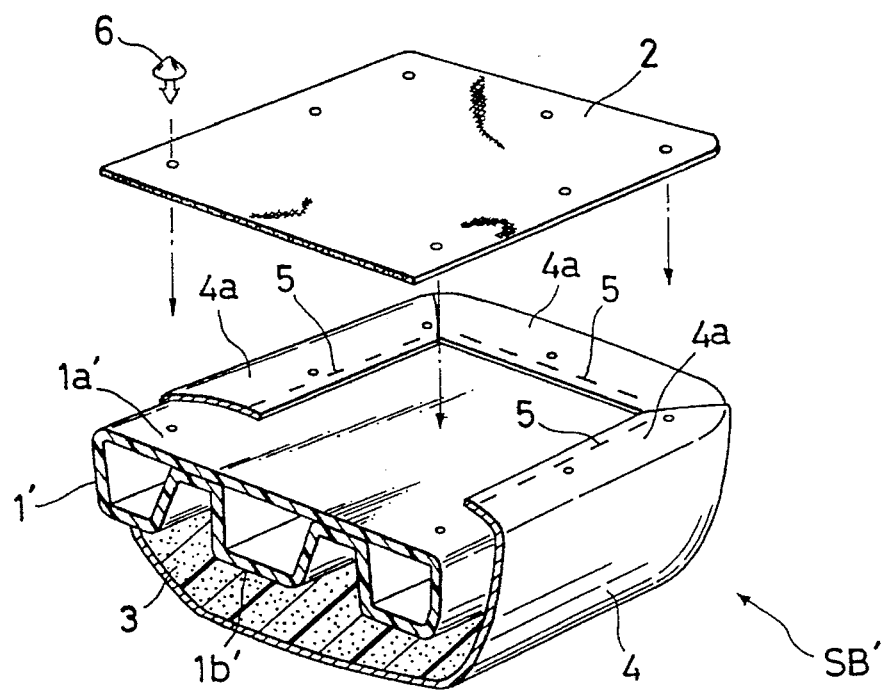
FIG. 1 is a partly broken, exploded perspective view of a conventional arrangement for securing a terminal end of covering member to a seat back of forwardly-foldable-type automotive seat.
Figure 2:
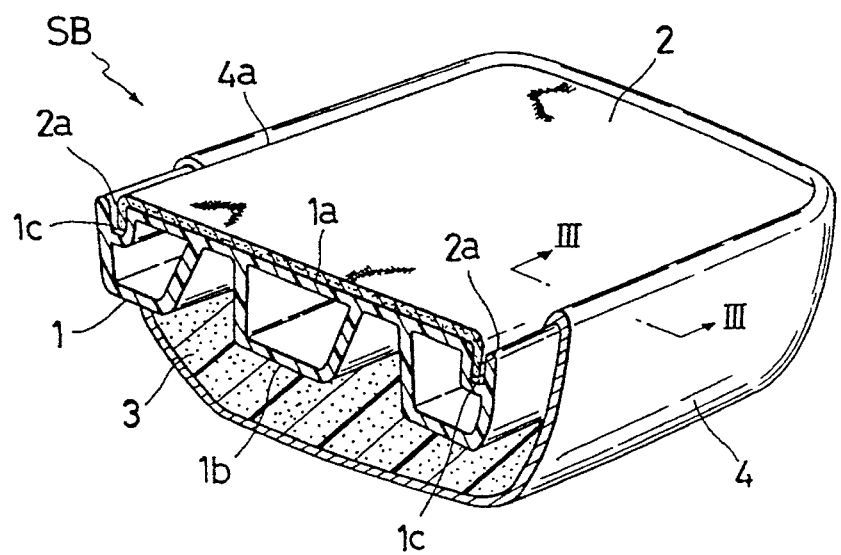
FIG. 2 is a partly broken, exploded perspective view of a first embodiment of an arrangement in accordance with the present invention.
Figure 3:
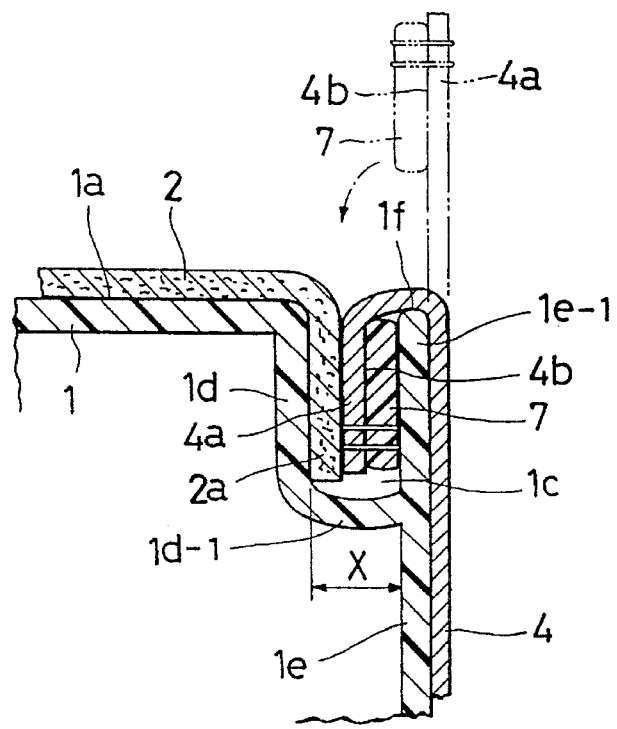
FIG. 3 is a partially sectional view taken along the line III—III in the FIG. 2.

Referring to FIG. 3 in conjunction with FIG. 2, there is illustrated a first embodiment of the present invention.

In this embodiment, a seat back (SB) is provided, which utilizes the same upholstery elements with those of the previously stated conventional seat back (SB'), namely, the foam cushion member (3), the covering member (4) and the carpet (2). Thus, only in this regard, all like designations refer to all like ones to be given hereinafter, and the way for affixing the covering member (4) over the foam cushion member (3) is substantially the same with that in the prior art.

Designation (1) denotes a seat back frame which is blow molded into the illustrated shape having an uneven frontal surface (1b) and flat reverse surface (1a) similarly to the prior-art seat back frame (1'). But, as shown in FIGS. 2 and 3, the seat back frame (1') is formed with a securing groove (1c) in the reverse surface (1a) thereof, the securing groove (1c) extending along the whole peripheral end or outer contour of the seat back frame (1) on its reverse surface (1a).

As best shown in FIG. 3, the securing groove (1c) is of a generally "U" shape in cross-section, including a pair of opposedly faced inward and outward vertical walls (1d)(1e-1) and a bottom wall (1d-1) intermediate those two vertical walls (1d)(1e-1). The outward vertical wall (1e-1) is defined at an upper end portion of the lateral wall (1e) of seat cushion frame (1).

The carpet (2), in contrast to the prior art one, is subject to a blow molding process for forming the seat cushion frame (1) and already welded upon the resulting reverse surface (1a) of the same frame (1), such that outer ends of carpet (2) are bent into the resulting securing groove (1c). This is a most preferred embodiment, but not necessarily limited thereto. As another example, the carpet (2) is bonded, using an adhesive, upon the the seat cushion frame reverse surface (1a) in the same manner.

A securing member (7) is fixed by sewing to the inward surface (4b) of the covering member terminal end (4a) as shown in FIG. 3. As indicated by the two-dot line in the FIG. 3, the covering member terminal end (4a) is folded over the top (1f) of outward vertical wall (1e-1) in the downward arrow direction and inserted with the securing member (7) into the foregoing securing groove (1c). Since the carpet outer end (2a) has been inserted in that securing groove (1c), all the covering member terminal end (4a), securing member (7) and carpet end (2a) are juxtaposed with one another within the groove (1c) as shown, and among them, the terminal end (4a) and carpet end (2a) are pressingly urged by the securing member (7) in a direction toward the inward wall (1d) of groove (1c), while at the same time, the securing member (7) itself presses the opposite outward wall (1e-1) of the same groove (1c). This pressing action is further enhanced by defining a slightly small width (X) of the groove (1c) relative to a thickness of all those three layers (2a, 4a, 7). Here, it should be noted that such pressure may be adjusted by varying the thickness of securing member (7) with respect to the given groove width (X), in which sense, the securing member (7) acts to apply a lateral pressure, giving thus two oppositely directed components of pressure towards the inward and outward walls (1d)(1e-1) of groove (1c), respectively. Accordingly, a great friction is caused between the carpet outer end (2a) and covering member terminal end (4), enough to make positive the securement of both ends (2a)(4) in the groove (1c) and prevent their slipping off therefrom. To effect this securement practically, the securing member (7) should of course be small in height relative to the groove (1c), but more importantly should have a proper thickness to press both covering member terminal end (4b) and carpet end (2a) against the groove inward wall (1d) in order to produce sufficient friction therebetween. Also, the securing member (7) should preferably be formed from a suitable elastic synthetic resin material (e.g. nylon) in the shape of a belt-like long plate having a length substantially equal to that of the securing groove (1c). However, this is not limited thereto, but may be formed into four separate plates in conformity with the illustrated rectangular securing groove (1c) or in any other desired number and shape insofar as it serves such securing purpose. Additionally, the width (X) of groove (1c) should be slightly smaller than a thickness totalled by the respective thicknesses of carpet end (2a), covering member terminal end (4a) and securing member (7) in the aggregation.

Accordingly, it is appreciated that the juxtaposed layers of carpet end (2a) and covering member terminal end (4a) are inserted in the securing groove (1c) which is situated not only below the reverse surface (1a) of seat back frame (1) but also along the outer contour of the same seat back frame (1), thus avoiding creation of a level difference or unevenness between the carpet and covering member terminal end (4a) upon the seat back reverse surface (1a), which is found defective in the prior art. Further, both ends of carpet (2) and covering member (4) are firmly secured in the securing groove (1c) with a proper friction by way of the pressure action of the securing member (7) in cooperation with the relatively small width (X) of securing groove (1c).

Figure 4:
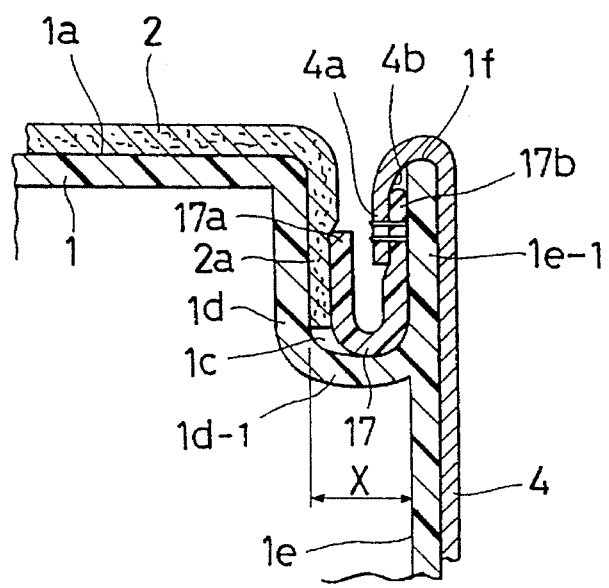
FIG. 4 is a partially sectional view showing a second embodiment of the invention, as viewed likewise in FIG. 3.

It is noted also as advantageous aspect that, as can be seen from FIG. 4, the terminal end (4b) of covering member (4) is not fully contacted on the top (1f) of outward wall (1e-1) because of the securing member being interposed between that outward wall (1e-1) and terminal end (4b), thereby preventing damage or cut of the terminal end (4b) when a normal or great load is applied to the covering member (4).

It should be understood, now, that the securing member (7) is provided as a means for giving a pressure to create a friction against the inner walls of securing groove (1c), by which friction, in the first embodiment above, both of the covering terminal end (4a) and carpet end (2a) are secured firmly in the groove (1c). In accordance with the present invention, this pressure/friction function is further embodied as a second mode of securing member (17) in FIG. 4 and a third mode of securing member (27) in FIGS. 5 to 7.

Reference is made to FIG. 4, which illustrates a second embodiment of the present invention. In the present embodiment, the same securing groove (1c) is utilized, except that the second mode of securing member is provided as designated by (17), having a generally U-shaped configuration in section, in place of the plate-like one (7) provided in the first embodiment. As shown in FIG. 4, one base end (17b) of the securing member (17) is fixed by sewing to the inward surface (4b) of the covering member terminal end (4a), and likewise as in the first embodiment, the terminal end (4a) is folded over the top (1f) downwardly into the groove (1c) together with the securing member (17). As different from the first embodiment, the securing member (17) is bodily inserted in the groove (1c), with another free end (17a) thereof in direct contact with the carpet end (2a). The securing member (17) per se, by reason of its "U" shape in section, gives a more resilient lateral pressure than the plate-like securing member (7) of the first mode explained above, thereby exerting two oppositely directed components of pressure upon the carpet end (2a) (i.e. the inward wall (1d)) and the outward wall (1e-1), respectively. In other words, the carpet end (2a) is pressed by the free end (17b) of securing member (17) against the inward wall (1d) of groove (1c), while the base end (17b) thereof gives an opposite pressure against the outward wall (1e-1) of groove (1c). Consequently, a sufficient friction occurs between the carpet end (2a) and securing member (17), thereby making positive the securement of the covering member terminal end (4a) in the securing groove (1c).

Of course, the width (X) of securing groove (1c) should be slightly smaller than a thickness totalled by the ones of carpet end (2a) and U-shaped securing member (17) in the aggregation, and at the same time, the width of U-shaped securing member (17) be slightly greater than the groove width (X), so as to produce an optimal repercussive pressing force in that securing member (17) and thus a high friction force for the positive securing purpose.

Figure 5:
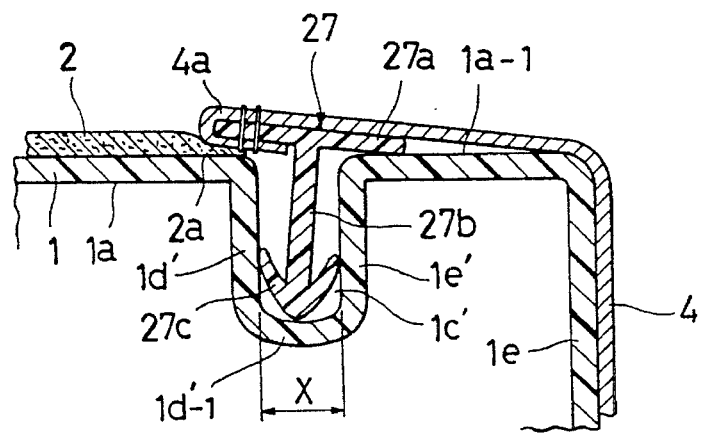
FIG. 5 is a partially sectional view showing a third embodiment of the invention, as viewed likewise in FIG. 3.
Figure 6:
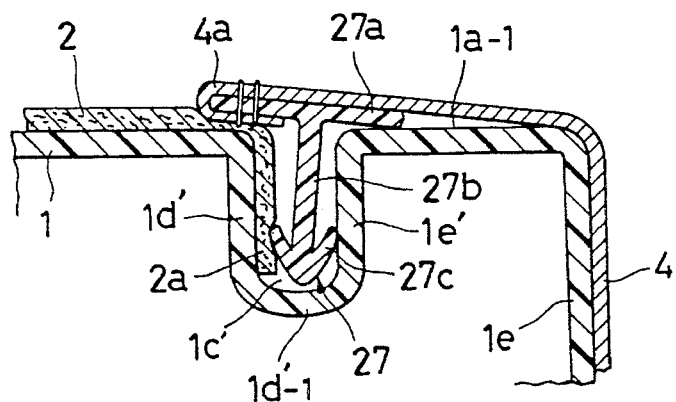
FIG. 6 is a partially sectional view showing a fourth embodiment of the invention, as viewed likewise in FIG. 3.
Figure 7:
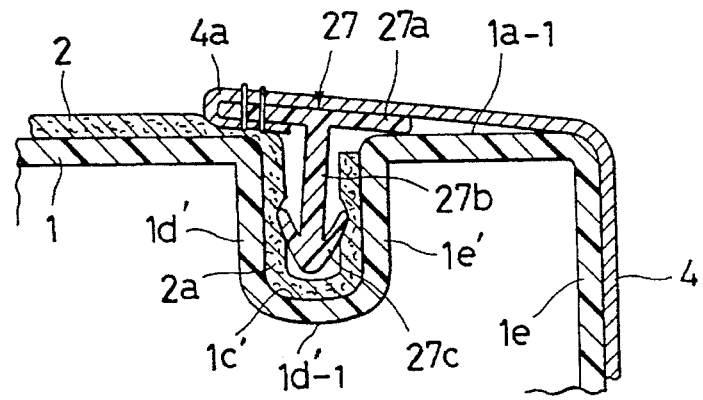
FIG. 7 is a partially sectional view showing a fifth embodiment of the invention, as viewed likewise in FIG. 3.

Reference being made to FIGS. 5 through 7, there is shown the third mode of securing member (27) as a common pressure giving means in regard to each of the third, fourth and fifth embodiments respectively shown in FIGS. 5, 6 and 7.

The securing member (27) is so formed as to comprise a horizontal plate section (27a) and a vertical leg section (27b) of a generally arrow shape in section, with an arrow-like pressure giving end portion (27c) defined in the end of that vertical leg section (27b).

In all three embodiments shown in FIGS. 5, 6 and 7, a securing groove (1c') is defined a distance away from or adjacent to the peripheral end or outer contour of seat cushion frame. As shown, the securing groove (1c') comprises a pair of inward and outward walls (1d')(1e') and a bottom wall (1d'-1) intermediate them.

Also, as in all FIGS. 5, 6 and 7, the terminal end (4a) of covering member (4) is fixed by sewing to one lateral end of horizontal plate section (27a) associated with the securing member (27). Such one lateral end of securing member plate section (27a) rests on the carpet outer end (2a) laid on the inward area of seat back frame reverse surface (1a) surrounded by the groove (1c'). Therefore, as illustrated, the margin area (1a-1) is defined, extending outside the groove (1c') and along the outer contour of seat back frame (1). The purpose of such margin area (1a-) is to provide a support plane for supporting another lateral end of the securing member plate section (27a) thereon.

In the present three embodiments, a similar resilient lateral pressure is acted by the arrow-shaped securing member (27), instead of the U-shaped securing member (17) of the second embodiment above, so as to give two oppositely directed components of pressure to the two vertical walls (1d')(1e') of securing groove (1c'), respectively. But, strictly stated, when inserted in the securing groove (1c') of a relatively small width (X), the arrow-shaped securing member (27) applies two symmetrically repercussive forces to those two groove walls (1d')(1e'), respectively, more sharply than the U-shaped securing member (17) of the second embodiment, by virtue of its peculiar arrow-shaped end portion (27c).

FIGS. 5 shows the present securing member (27) to be inserted in the securing groove (1c'). Its arrow-shaped end portion (27c) is directly contacted with both vertical walls (1d')(1e') of groove (1c'), applying two symmetrically repercussive forces thereto, respectively, at an acute angle relative thereto. Hence, a sharp, great friction occurs between the securing member (27) and both two opposite walls (1d') (1e'-1), thereby making firm the securement of the covering member terminal ends (4a) in the securing groove (1c').

FIG. 6 shows the fourth embodiment of the present invention, wherein the outer end (2a) of carpet (2) is extended into the securing groove (1c'), such as to be folded downwardly along the vertical wall (1d') of groove (1c'). By being so arranged, the groove width (1c') may be smaller, and therefore, the repercussive force of the arrow-shaped securing member (27) may be greater, to thereby make more firm the securement of covering member terminal ends (4a) in the groove (1'c), as compared with the third embodiment above.

FIG. 7 shows the fifth embodiment of the present invention, wherein the outer end (2a) of carpet (2) is further extend into the securing groove (1c') such as to be laid on the whole inner walls (1d', 1d'-1, 1c'). In this case, naturally the groove width (X) is made further smaller than that of the fourth embodiment above to increase more the repercussive force of the securing member (27), and in addition thereto, it is possible not only to suppress an unpleasant noise emitted from a contact between the securing member (27) and groove walls (1d', 1d'-1, 1e'), but also to protect the securing member (27) per se against damage or breakage which may occur due to an excessive pulling force applied through the covering member (4).

It is appreciated that, while the securing members (7) and (17) in the first and second embodiments may be adjusted their respective lateral pressures or repercussive forces by varying their respective thicknesses, the foregoing third mode of securing member (27) may be adjusted its repercussive force by simply extending the carpet outer end (2a) into the securing groove (1c') as seen from FIGS. 5, 6 and 7.

In accordance with the present invention, therefore, both terminal ends (4a) of covering member (4) and outer end (2a) of carpet (2) can be easily secured at one time to the reverse surface of seat back frame (1). In particular, in the first and second embodiments shown in FIGS. 3 and 4, there is eliminated such creation of level difference or unevenness in the surface of carpet (2) as found in the prior art.

Finally, the present invention is not limited to the illustrated embodiments, but any other modifications, replacements and additions may structurally be applied thereto without departing from the scopes and spirits of the appended claims. For example, the invention may be applied to a seat cushion or any other portions of the automotive seat, not to mention other kinds of seat than the forwardly-foldable-type seat.

What is claimed:

1. In an automotive seat including a blow-molded seat frame having a frontal surface and a reverse surface, a cushion member on said frontal surface of said seat frame, a covering member covering at least a portion of said cushion member and a carpet on said reverse surface of said seat frame,
   an arrangement for securing a terminal end of said covering member to the seat, comprising:
   a securing groove formed in said reverse surface of said seat frame;
   a securing means integral with said covering member for insertion into said securing groove provided at said terminal end of said covering member to firmly secure said terminal end of said covering member to said seat frame and to secure an end of said carpet at said reverse surface of said seat frame.

2. The arrangement as defined in claim 1, wherein said end of carpet is located in said securing groove and secured in said securing groove by said securing means.

3. The arrangement as defined in claim 1, wherein said securing means comprises a plate-like securing member of a synthetic resin material sewed to a reverse side of said covering member terminal end, and wherein both said plate-like securing member and said end of said carpet are designed to be inserted and secured in said securing groove.

4. The arrangement as defined in claim 1, wherein said securing means comprises a generally U-shaped securing member made of a synthetic resin material, and wherein said generally U-shaped securing member is inserted and secured in said securing groove, such that one side of said securing member acts to retain said end of said carpet.

5. The arrangement as defined in claim 1, wherein said securing means comprises a generally arrow-shaped securing member including a horizontal plate section, a vertical section and an arrow-shaped end section, all of which are formed with one another integrally, wherein said covering member terminal end is fixed to said horizontal plate section of said generally arrow-shaped securing member, and wherein said securing member is secured to said securing groove, such that said arrow-shaped end section thereof is inserted securely within said securing groove, and that said horizontal plate section thereof acts to retain said end of said carpet at a point adjacent to said securing groove.

6. The arrangement as defined in claim 1, wherein said carpet is welded to said reverse surface of said blow molded seat frame in blow molding said seat frame.

7. The arrangement as defined in claim 1, wherein said seat is a seat back of a forwardly-foldable-type automotive seat, which serves as a load-carrying platform.

8. The arrangement as defined in claim 1, wherein said securing means comprises a generally arrow-shaped securing member including a horizontal plate section, a vertical section and an arrow-shaped end section, all of which are formed with one another integrally, and wherein said generally arrow-shaped securing member is secured to said securing groove, such that said arrow-shaped end section thereof is inserted securely within said secring groove.

9. The arrangement as defined in claim 8, wherein said end of said carpet is retained within said securing groove by said arrow-shaped end section of said securing member.

* * * * *